United States Patent [19]

Austin

[11] 4,173,948
[45] Nov. 13, 1979

[54] APPARATUS FOR ADJUSTABLY HOLDING A HOG WATERING DEVICE

[76] Inventor: Charles D. Austin, Box 280, R.R. 2, Nebraska City, Nebr. 68410

[21] Appl. No.: 842,632

[22] Filed: Oct. 17, 1977

[51] Int. Cl.² .............................................. A01K 7/00
[52] U.S. Cl. .................................... 119/72; 119/72.5; 119/75
[58] Field of Search ................... 119/75, 72, 72.5, 61; 248/225.4, 226.2, 125, 411, 311.1, 314

[56] References Cited

U.S. PATENT DOCUMENTS

| 442,629 | 12/1880 | Lipscomb | 248/225.4 |
|---|---|---|---|
| 1,774,550 | 9/1930 | Gutenkunst | 119/75 X |
| 2,988,048 | 6/1961 | Zimmerman | 119/61 X |
| 3,613,642 | 10/1971 | Restall et al. | 119/75 |

*Primary Examiner*—Hugh R. Chamblee
*Attorney, Agent, or Firm*—Henderson & Sturm

[57] ABSTRACT

Adjustable apparatus is disclosed for holding a hog watering pipe with a depending nipple valve thereon. The apparatus includes a pair of elongated angle irons with a frictional lock on one end thereof for engagement with the pipe. A pipe holding bracket is slidably mounted on the angle irons such that the co-operation between the lock and the bracket allows selective positioning of the nipple valve.

2 Claims, 5 Drawing Figures

U.S. Patent  Nov. 13, 1979  4,173,948
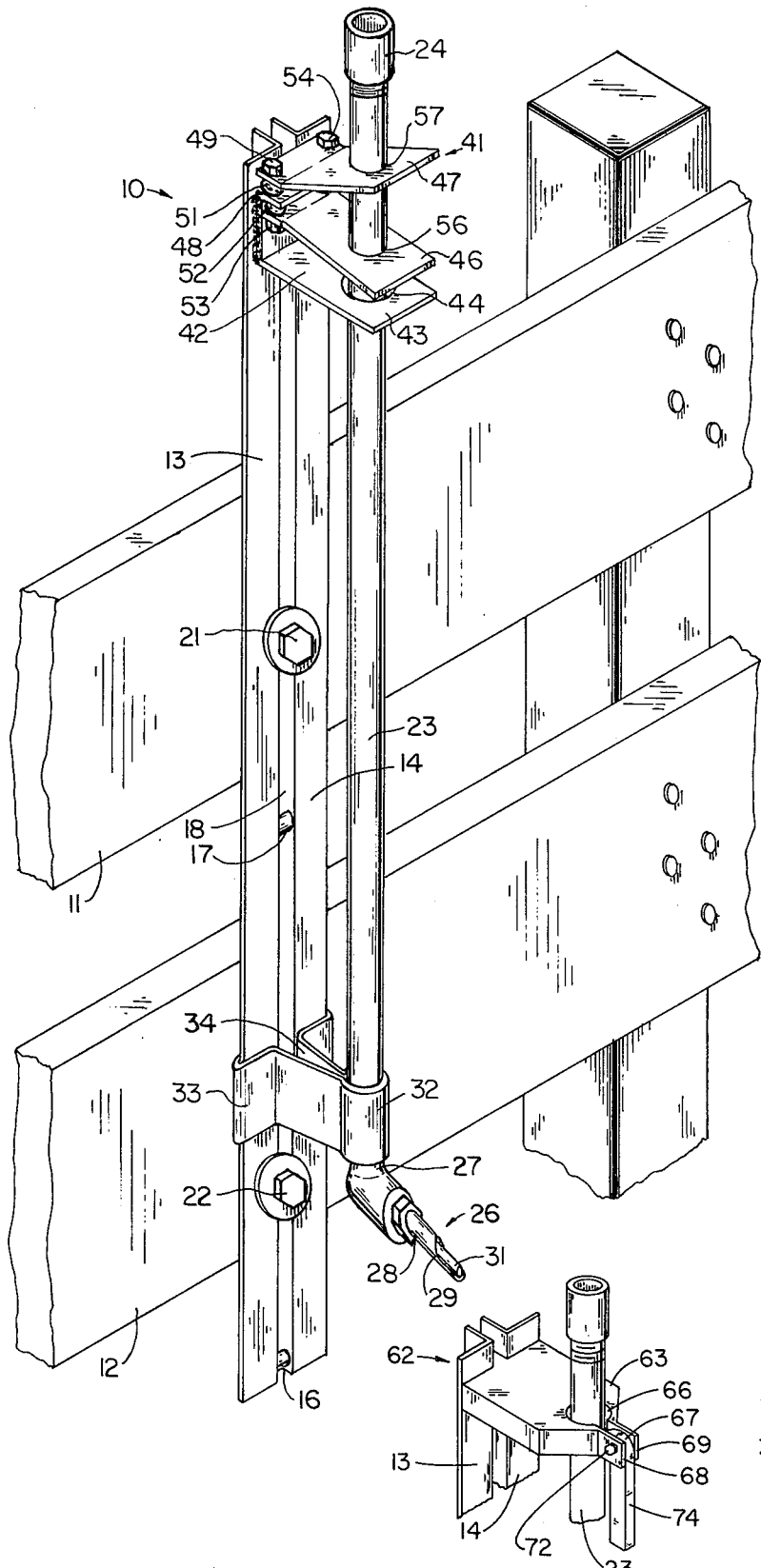
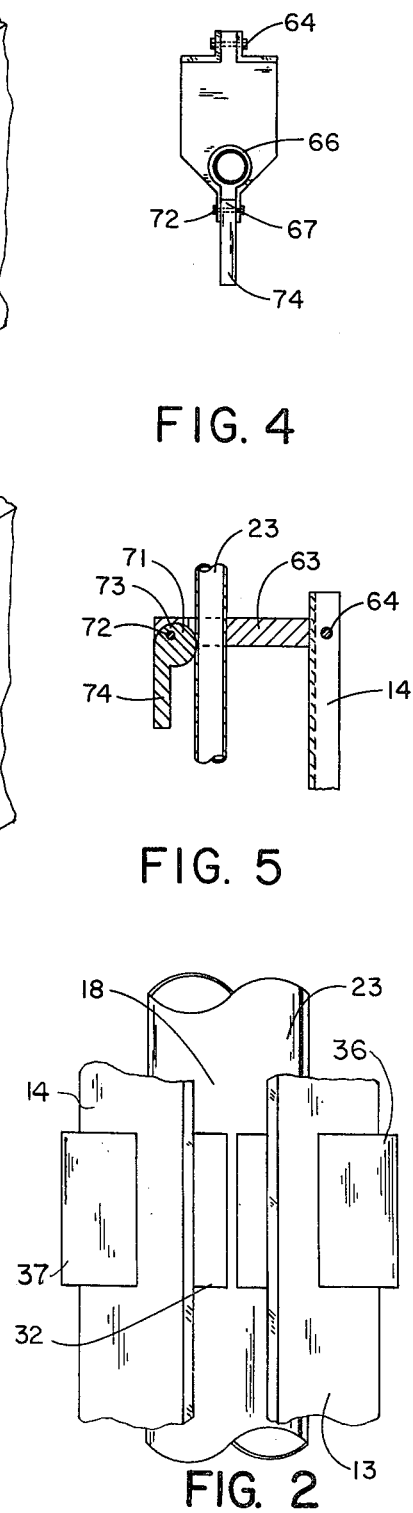
FIG. 1  FIG. 3  FIG. 2
FIG. 4
FIG. 5

APPARATUS FOR ADJUSTABLY HOLDING A HOG WATERING DEVICE

BACKGROUND OF THE INVENTION

This invention relates generally to hog watering systems, and more specifically to apparatus for adjustably holding a hog watering pipe.

In recent years the business of raising hogs for commercial sale has become a very sophisticated undertaking. Advances in the technology include the development of hog confinement systems which drastically reduce the labor costs involved with pork production. Most confinement systems in use today include a walled structure with a specially designed slatted floor, a sanitary flushing system, an automatic feeding apparatus, a demand watering apparatus, and sometimes even an air conditioning system.

Normally, the watering devices employed have comprised a nipple valve which the hog learns to either nudge or suckle to obtain water. Such device have, heretofore, been fixed to the wall of the confinement system to maintain the nipple valve at a fixed height above the floor. The problem with this arrangement is that the hogs increase in size and eventually are unable to obtain sufficient amounts of fluids from the nipple. With a fixed-height watering system, it is very inconvenient to make adjustments for hog size, or it is very expensive to install and maintain multiple nipple valve waterers at varying heights.

The invention to be described below is designed to remedy the above-noted problem and increase the efficiency of the system.

BRIEF SUMMARY OF THE INVENTION

It is therefore an object of this invention to provide novel adjustable apparatus for holding a hog watering device.

It is another object of this invention to provide adjustable apparatus for holding a hog watering device which is easily affixed to a wall support.

It is another object of this invention to provide adjustable apparatus for holding a hog watering device which may be secured at any position to a wall support.

It is a further object of this invention to provide adjustable apparatus for holding a hog watering device which requires the use of less hose between a rigid water supply system and the device.

It is an even still further object of the instant invention to provide adjustable apparatus for holding a hog watering device which is inexpensive of manufacture, durable of construction and extremely effective in use.

These, and other, objects are attained according to the instant invention by providing an adjustable apparatus for holding a hog watering pipe with a depending nipple valve thereon. The apparatus includes a pair of elongate angle irons with a frictional lock on one end thereof for engagement with the pipe. A pipe holding bracket is slidably mounted on the angle irons such that the co-operation between the lock and the bracket allows selective positioning of the nipple valve.

BRIEF DESCRIPTION OF THE DRAWINGS

The advantages of this invention will become apparent upon consideration of the following detailed disclosure of the invention, especially when taken in conjunction with the accompanying drawings wherein:

FIG. 1 is a perspective view of the apparatus of the instant invention showing it attached to a fence;

FIG. 2 is a partial rear view of the apparatus of FIG. 1 showing the sliding pipe bracket.

FIG. 3 is a partial view in perspective of a modified embodiment of the locking mechanism;

FIG. 4 is a top plan view thereof; and

FIG. 5 is a sectional view taken along the lines 5—5 in FIG. 4.

DESCRIPTION OF THE PREFERRED EMBODIMENT

Referring now to FIG. 1, the inventive apparatus 10 is shown affixed to the slats 11 and 12 of a fence. Apparatus 10 comprises two elongated angle irons 13 and 14 which are partially held together by bolts (not shown) and spaced apart by spacers 16 and 17 to form a gap 18 therebetween. The spacers 16 and 17 are of sufficient size to make gap 18 large enough to pass bolts 21 and 22 therethrough for affixment of the apparatus to the fence slats 11 and 12, respectively. Obviously, any number of bolts may be used to secure the apparatus.

The water pipe 23 is adapted at end 24 to be affixed to a flexible water supply hose. A nipple valve 26 is affixed to end 27 of pipe 23 and is in fluid flow communication therewith. The valve, well known in the art, comprises a casing 28 with a beveled slot 29 cut along one side thereof. A valve actuator 31 extends into the beveled area and opens the valve to fluid flow when pressed to one side. The actuator is biased into a closed position such that there is no leakage when a hog is not performing the act of watering.

The adjustment which apparatus 10 provides is to selectively move nipple valve 26 up and down along the angle irons 13 and 14 relative to the ground.

The pipe 23 is affixed to slidable pipe bracket 32 which includes arms 33 and 34. Referring briefly to FIG. 2, it can be seen that arms 33 and 34 each terminate in flanges 36 and 37 which loosely grip the angle irons to form a slidable connection therewith.

The locking mechanism is shown generally at 41 in FIG. 1. A generally C-shaped member 42 is affixed to both angle irons 13 and 14, and has one leg 43 thereof extending outwardly to slidingly engage pipe 23 through hole 44. Leg 43 and hole 44 do not actually engage pipe 23, but rather serves the purpose of a guide for the pipe to make the locking mechanism operate more smoothly. The locking function of mechanism 41 is accomplished by plates 46 and 47 which are affixed to leg 48 of member 42. A bolt 49 extends through plate 47, resilient spacer 51, leg 48, resilient spacer 52, plate 46, and is secured in place by a nut 53. An identical arrangement is located on the other side of the unit and is held together by bolt 54. Plates 46 and 47 each have a hole therethrough, 56 and 57, respectively, through which pipe 23 passes. Also, each of the plates 46 and 47 is angled in diverging directions away from their connection of bolts 49 and 54. Thus, the resilient spacers bias the edges of the holes 56 and 57 into frictional engagement with pipe 23 to hold it in position. To adjust the height of nipple valve 26, one need only press plates 46 and 47 together and simultaneously move the pipe 23 to the desired location. By releasing the plates, the biasing spacers cause them to engage the pipe again. Of course, the pipe bracket 32 slides along the angle irons with the pipe to provide the necessary support.

A modified embodiment of the locking mechanism is designated generally by the numeral 62 in FIGS. 3–5.

The mechanism 62 includes a plate 63 affixed to the angle irons 13 and 14 proximate their upper ends by a bolt and nut 64. The plate is horizontally disposed and projects forwardly of the angle irons. Drilled vertically through the plate proximate its forward end is a hole 66 having a diameter slightly greater than the outside diameter of the pipe 23. A slot 67 is cut in the forward end of the plate wherein the rear end of the slot connects with the hole 66 thus forming a pair of ears 68 and 69 with one being disposed on each side of the slot. A horizontal hole 71 is formed through the ears for receiving a bolt and nut 72. The bolt 72 serves as a pin and pivotally mounted thereon is a cam lever 73 having a handle 74 affixed thereto. An opening 76 is drilled through the lever 73 for receiving the bolt 72. Pivoting the cam lever 73 from a horizontal position to a vertical position causes the cam surface to frictionally engage and fix the pipe in the plate. In a horizontal position the cam lever does not engage the pipe and the pipe can be slidably raised or lowered relative to the plate.

It will be understood that various changes in the details, materials, steps and arrangements of parts, which have herein been described and illustrated in order to explain the nature of the invention, will occur to and may be made by those skilled in the art upon a reading of the disclosure within the principles and scope of the invention.

I claim:

1. An improved apparatus for adjustably holding a hog watering device in which a nipple valve is affixed to the end of an elongated pipe in fluid communication, wherein the improvement comprises:
   (a) an elongated base adapted to be secured to a support comprising a first and second angle irons affixed to each other so as to substantially form a T with the common legs of the angle irons spaced apart to form a slot along the length thereof;
   (b) a manually slidable pipe bracket secured with said pipe which includes two arms wherein the ends of said arms are angularly disposed so as to engage the longitudinal edges of said first and second angle irons;
   (c) a frictional locking means comprising a first and second plates pivotally mounted to one end of said elongated base wherein the first and second plates are biased angularly and disposed so as to extend divergingly away therefrom and a third plate perpendicularly disposed and secured to said elongated base, said three plates each having a hole, in alignment whereby said first and second plates are pressed together to permit passage and selective adjustment of said pipe extending therethrough.

2. An improved apparatus for adjustably holding a hog watering device in which a nipple valve is affixed to the end of an elongated pipe in fluid communication, wherein the improvement comprises:
   (a) an elongated base adapted to be secured to a support comprising a first and second angle irons affixed to each other so as to substantially form a T with the common legs of the angle irons spaced apart to form a slot along the length thereof;
   (b) a manually slidable pipe bracket secured with said pipe which includes two arms wherein the ends of said arms are angularly disposed so as to engage the longitudinal edges of said first and second angle irons; and
   (c) a frictional locking means comprising a plate fixed to said elongated base, having a hole proximately located at its forward end and a pivotable cam lever affixed to said forward end so as to frictionally engage said pipe passing therethrough.

* * * * *